United States Patent [19]
Phela, Jr. et al.

[11] 3,746,867
[45] July 17, 1973

[54] RADIATION RESPONSIVE SIGNAL STORAGE DEVICE

[75] Inventors: Robert J. Phela, Jr.; John O. Dimmock, both of Concord, Mass.

[73] Assignee: Massachusetts Institute of Technology, Cambridge, Mass.

[22] Filed: Apr. 19, 1971

[21] Appl. No.: 135,477

Related U.S. Application Data

[63] Continuation of Ser. No. 777,337, Nov. 20, 1968, abandoned.

[52] U.S. Cl............... 250/209, 178/7.1, 250/211 J, 250/220 M, 317/235 N, 340/173 LS
[51] Int. Cl.... G11c 11/44, H01j 39/12, H011 11/00
[58] Field of Search............ 250/211, 211 J, 213 A, 250/220 M, 209; 317/235 N; 340/173 LS; 178/7.1

[56] References Cited
UNITED STATES PATENTS

| | | |
|---|---|---|
| 3,407,394 | 10/1968 | Hartke.......................... 317/235 X |
| 3,083,262 | 3/1963 | Hanlet........................... 340/173 LS |
| 3,390,311 | 6/1968 | Aven et al...................... 250/211 J |
| 3,562,425 | 2/1971 | Poirier........................... 250/211 J |

Primary Examiner—James W. Lawrence
Assistant Examiner—T. N. Grigsby
Attorney—Thomas Cooch, Edward D. Thomas, Robert Shaw, Robert T. Dunn, Martin M. Santa and Arthur A. Smith, Jr.

[57] ABSTRACT

Incident radiation (write-in radiation) is directed to a metal-insulator-semiconductor sandwich which defines a photo-detector in electrical circuit with electrical charge storage means, so that the amount of charge stored by the sandwich is changed, causing a change in the electrical response of the sandwich to other radiation (read-out radiation) directed thereto. Thus, invormation represented by the write-in radiation is stored by the sandwich and later this stored information is read out by noting the electrical response to the read-out radiation.

25 Claims, 12 Drawing Figures

Patented July 17, 1973
3,746,867
5 Sheets-Sheet 1
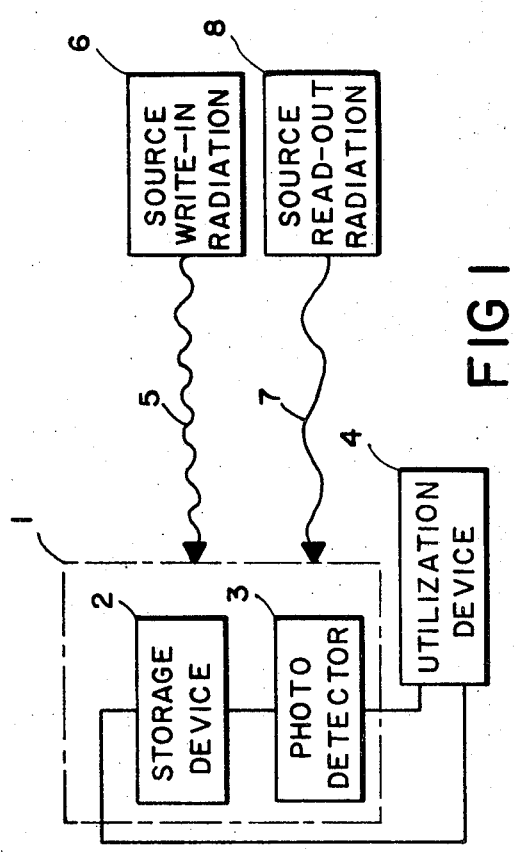
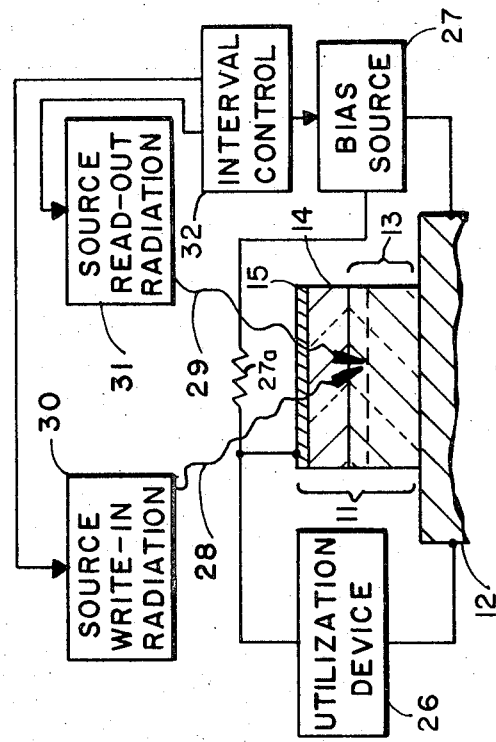
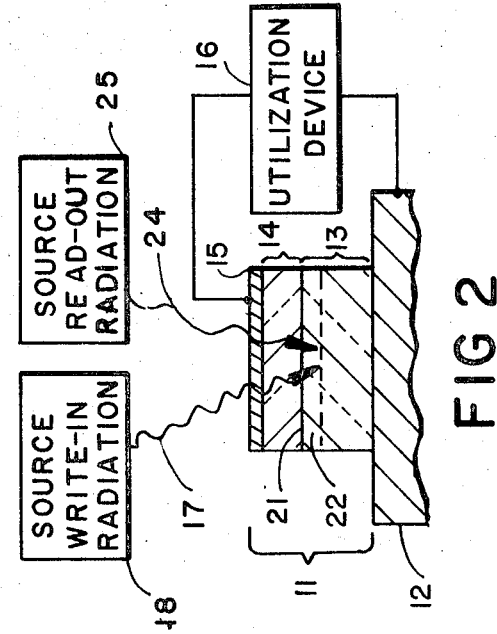
INVENTORS
ROBERT J. PHELAN JR
JOHN O. DIMMOCK
BY *Robert T. Ormin*
ATTORNEY Patented July 17, 1973 3,746,867

INVENTORS
JOHN O. DIMMOCK
ROBERT J. PHELAN JR.
BY *Robert T. Dunn*
ATTORNEY

INVENTORS
JOHN O. DIMMOCK
ROBERT J. PHELAN JR.

RADIATION RESPONSIVE SIGNAL STORAGE DEVICE

This application is a continuation application of a co-pending application Ser. No. 777,337, filed Nov. 20, 1968, now abandoned.

This invention was made in the course of work performed under a contract with the Electronic Systems division, Air Force Systems Command, United States Air Force.

The invention relates to signal storage devices and particularly to signal storage devices in which information is stored in response to incident radiation, and which can be interrogated to read the stored information producing an electrical signal representative thereof.

Dielectric or insulating materials have been employed for storing charge which represents a signal. The storage of charge in the dielectric has been induced by an electron beam directed to the material, as in scan conversion cathode ray tubes. It has been suggested that such a dielectric be employed in conjunction with a radiation responsive device, such that the device generates a charge in response to incident radiation and this charge is conducted to and stored in the dielectric. Thereafter, an electron beam directed close to the dielectric is modulated by the stored charge and so, in the modulation the stored information represented by the charge is read out.

It is an object of the present invention to provide a device for storing signals representative of incident radiation and for detecting these stored signals producing an electric signal representative thereof when other radiation is directed to the device. This being accomplished, information can be stored and read out without using an electron beam and the cumbersome cathode ray tube evacuated envelope.

It is another object of the present invention to provide a solid-state device for storing information in response to incident radiation and producing an electric signal representative of the stored information in response to the present radiation.

It is another object of the present invention to provide such a device in which the incident radiation is infrared.

It is another object of the present invention to provide a solid-state device as in the foregoing and in which the materials are selected so that the device is responsive to incident radiation of selected wavelength and/or selected intensity.

It is another object of the present invention to provide a solid-state device as in the foregoing and in which the materials are selected to provide a determined maximum storage interval.

It is another object of the present invention to provide a solid-state device as in the foregoing and in which stored information can be read out without substantially erasing it and yet it can be erased, if desired.

The basic principles involved in operation of devices incorporating features of the invention involve the modification of charge trapped in a dielectric or at the interface between the dielectric and a selected semiconductor material. The trapped charge in the dielectric changes the electrical condition of the adjacent semiconductor and affects its response to other radiation. This phenomenon is described in considerable detail in copending application, Ser. No. 697,418, entitled "Metal Insulator Semiconductor Radiation Detector," filed January 12, 1968, by Robert J. Phelan, Jr. et al and now U.S. Pat. No. 3,497,698. That application describes construction and use of a radiation detector, referred to as a metal insulator semiconductor (MIS) or a metal oxide semiconductor (MOS). Embodiments of the present invention contemplate use of the MIS or the MOS structures. It has been found that with these structures the depletion region in the semiconductor can act as a fast photovoltaic detector and by changing the amount of trapped charge near the interface in the dielectric, the response of the photo-voltaic detector to radiation is modified. The amount of trapped charge can be changed by irradiating the structure with radiation referred to herein as write-in radiation. This change in response can be detected by directing other radiation herein, called read-out radiation, to the interface and noting the change in response of the photo-voltaic detector to the read-out radiation. Furthermore, the dielectric and semiconductor materials can be selected so that the read-out radiation does not substantially alter the trapped charge. This permits reading stored information without erasing it. The stored information can be intentionally erased by returning the trapped charge to some initial value.

Various embodiments of the invention described herein use different intensities and/or different wavelengths of light for the write-in radiation and the read-out radiation. For example, with certain materials the read-in is accomplished by a short exposure to relatively high intensity light or by relatively long exposure to relatively low intensity light, and read-out is accomplished by relatively short exposure to low intensity light, which preferably has a wavelength selected for high efficiency of conversion of this radiation in the depletion region, to an electrical signal. In addition, this radiation can be selected such that it does not alter the trapped charge. Thus, read-out is accomplished without substantial erasure. On the other hand, the read-out radiation can be of such intensity, wavelength, and/or duration to simultaneously erase while reading stored information.

In order to change the amount of trapped charge in the dielectric, the threshold of charging must be considered and so the energy of the incident photons must at least exceed this threshold or it will have little effect on the trapped charge. However, the adjacent semiconductor may respond to longer wavelengths. Thus, in many instances write-in is accomplished with radiation of relatively short wavelength, while read-out is accomplished with radiation of relatively long wavelength.

These objects and features of the invention, as well as others, will be apparent from the following specific description, taken in conjunction with the figures in which:

FIG. 1 is a functional block diagram illustrating general features of the storage device;

FIG. 2 is a cross-section view illustrating the principal structural features of an embodiment of the device, employing a MIS or MOS structure, in which information is stored in response to one beam of radiation and read-out in response to another beam of radiation;

FIG. 3 illustrates a similar embodiment in which the level of initial trapped charge in the dielectric is controlled by a voltage applied thereto;

Figure 11:
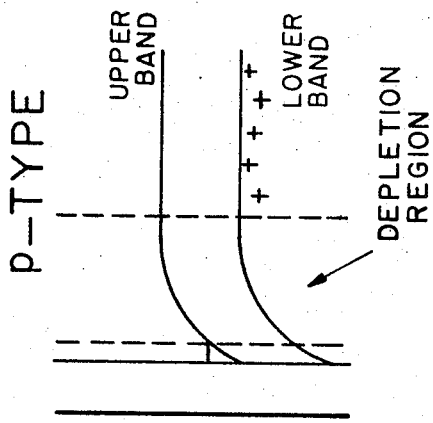
Figure 12:
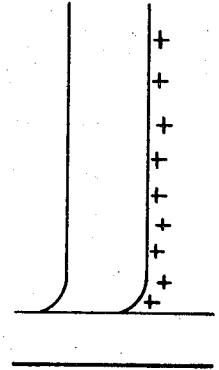
Figure 9:
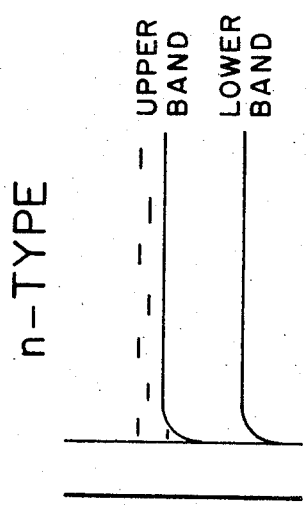
Figure 10:
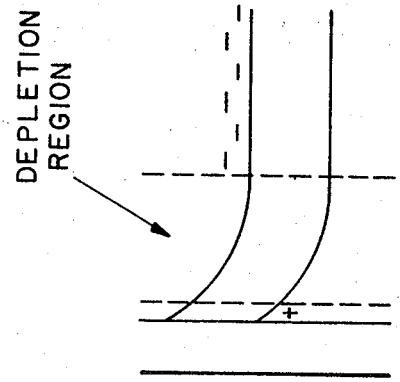

FIGS. 9 and 10 are band structure diagrams of an MOS structure, in which the semiconductor is n-type InSb, illustrating conditions when the device is shielded from all radiation and when it is exposed to radiation, respectively; and FIGS. 11 and 12 are band structure diagrams of an MOS structure, in which the semiconductor is p-type InSb, shielded from radiation and exposed to radiation, respectively, for comparison with FIGS. 9 and 10.

The MIS and MOS structures described in the above-mentioned copending application, Ser. No. 697,418, are suitable for use in the practice of the present invention. However, the principles of the present invention are not limited to use of the MIS or MOS structures described therein. Those structures lend themselves particularly to the practice of the present invention, because with them a compact solid-state device can be provided which is very small; and so a great many such storage devices can be provided in a small volume or in a small area. Furthermore, the MIS or MOS structure can be formed in a sheet of sufficiently large area that it is the equivalent of an array of a large number of separate storage devices.

The use of the MIS or MOS structure in this manner to provide an array of radiation detectors is described in considerable detail in copending application, Ser. No. 747,520, entitled "Radiation Converting," filed July 25, 1968, by Robert J. Phelan, Jr. and now U.S. Pat. No. 3,649,838. In that application, the MIS or MOS structures are used in conjunction with a radiation emitter to convert incident radiation of one wavelength into output radiation of another wavelength. An array of information storage devices is formed by continuous layers which define at any point thereon an MOS or MIS structure. This provides a vast number of separate information storage points on a relatively small surface, on which individual bits of information can be stored and read-out in a random manner. Accordingly, this sort of two-dimensional array is a possible use or arrangement of any of the devices described herein.

While MIS or MOS structures are preferred in the practice of the present invention, it is recognized that other structures could be employed which function similarly. For example, two functional members are involved, one for storing signals in response to incident radiation, and the other for producing an electrical signal indicative of the stored information, in response to radiation incident thereon. The nature of the two members is such that when information is stored in the first, the response of the second to the radiation which is directed to it is changed and the resulting electric output signal indicates this change. When the two members are so joined that all radiation illuminates both, and when nondestructive read-out is desired, the read-out radiation must not affect the condition of the storage member. This, of course, is not a problem if the two members are so constructed and connected that radiation directed to one does not get to the other. FIG. 1 illustrates the above principle and is a block diagram, illustrating the functions and interrelationship between the functions in the device In FIG. 1, a storage device 1 consists of a charge storage member 2 electrically coupled to a photo detector 3, which in turn electrically couples to a utilization device 4. Radiation 5 from the source 6, denoted write-in radiation, is directed to the device, so that in response, the electrical condition of member 2 changes from an initial state to a new state and remains in the new state even though the radiation 5 is discontinued. The detector 3 is so selected that it responds to radiation 7 from a source 8 denoted read-out radiation source, producing an electrical signal in the utilization device 4 when the radiation 7 is incident on the detector. The nature of the detector 3 is such that its response to the radiation 7 varies, depending upon the electrical condition of the storage member 2, and so for different electrical conditions of the storage member, different signals will be produced in the utilization device 4, in response to the radiation 7 incident on the detector 3.

The MIS and MOS structures incorporate both the storage and detector members 2 and 3 in a single solid-state sandwich, made up of layers of different materials. Thus, with the MIS and MOS structures it is difficult to prevent the read-out radiation from getting to the storage member, and so these members must be formed of materials which are so selected and the intensity and wavelength of the write-in and read-out radiations must be so selected that the composite sandwich structure will respond in one manner to the write-in radiation and will respond in another manner to the read-out radiation.

FIG. 2 is a sectional view of a MIS or a MOS structure 11 mounted on an electrically conductive body 12, which may be part of a cryogenic system maintaining the temperature of the solid-state structure 11 at a low temperature. The solid-state structure consists of a relatively large area semiconductor body or chip 13 is on the cold finger 12. An insulator or dielectric layer 14 if formed on the surface of the semiconductor over a relatively large area of the surface which may be as large as many square centimeters, and an electrically conductive film 15 is formed on the insulator layer. The conductive film 15 is preferably at least partially transparent to radiation which is directed to the solid state structure in operation. Quite clearly, the solid state structure 11 is the same as the MIS and MOS structures described in the above-mentioned copending application, Ser. No. 697,418.

For purposes of example, the semiconductor body 13 may be n-type InSb with a bulk concentration of between $10^{-14}$ and $10^{-18}/cm^3$ and the insulating or dielectric layer 14 may be produced by anodizing the surface of the InSb to form an oxide or by depositing a layer of pyrolytic $SiO_2$ on the surface of the InSb. When the surface is anodized to form the oxide, a thickness for the oxide of about 500 angstroms is suitable. The electrically conductive layer 15 may be a nickel film evaporated onto the oxide to a depth of about 100 angstroms. Electrical contacts are made to the nickel film 15 and to the electrically conductive body 12. These contacts connect with leads to a utilization device 16.

In operation, write-in radiation 17 from a source 18 is directed to the solid-state sandwich 11 so that it penetrates the electrically conductive layer 15 and causes a change in the amount of trapped charge in the dielectric layer 14. Under certain conditions, when the structure 11 is an InSb MOS structure that has been cooled to about 77°K in darkness and no voltage is applied across the structure by the utilization device 16, the energy bands bend down at the interface between the InSb and the oxide, providing an accumulation region in n-type InSb and a depletion region in p-type InSb. The energy bands under these conditions in the n-type and p-type InSb are illustrated in FIGS. 9 and 11, respectively. Thereafter, when the structure is illuminated by the write-in radiation 17 and the photon energy of the write-in radiation 17 is at least 1.2 eV, electron and hole pairs are created in the InSb and some of the photo excited electrons enter into the oxide layer 14 and become trapped there or at the interface 21. The depletion region 22 formed in the n-type InSb adjacent the interface 21 as a result of illumination by the write-in radiation 17 is shown in the energy diagram in FIG. 10.

After illumination by the write-in radiation 17 having photon energies in excess of 1.2 eV, the structure is illuminated by read-out radiation 24 from a source 25. If the photon energy of the read-out radiation is less than 0.5 eV, the device will respond as a photo-diode detector producing a signal in the utilization device 16; however, there will be little or no alteration in the amount of trapped charge in the dielectric layer 14.

Under initial conditions, where the solid-state n-type InSb-MOS structure 11 is in the dark, and even near room temperature, and when the photon energy of the write-in radiation 17 exceeds about 1.2 eV, photo-excited electrons in the InSb will be emitted into the oxide and become trapped there regardless of the initial state of the system and largely independent of the applied bias.

When the write-in photon energy is in excess of about 3.0 eV, the oxide layer 14 becomes photo-conductive, reaching a peak at about 3.9 eV and decreases somewhat at higher energies. At these high photon energies, electrons are still being emitted from the InSb into the oxide and, depending on the applied bias, these electrons will be either photo-conducted through the oxide (InSb bias negative) or accumulated and partially trapped at or near the interface 21 (zero bias or InSb positive). When the photon energy is between 3 and 4.5 eV, there is a competition between the photo-emission and photo-conductivity effects which prevents sufficient accumulation of charge to store signals. This competition can be affected by the application of bias. With positive bias on the InSb, charge storage is enhanced and a given wavelength causes charge storage. With negative bias on the InSb, the photo-conductivity can cause the charge to be released and so the same given wavelength could be used to erase.

Both the trapped charge in the oxide adjacent the interface 21 and the light induced photo-conductivity mentioned above (which occurs for photon energies between 3.0 and 4.5 eV) can have long lifetimes and the effects of both may persist for some time. Thus, response to read-out radiation of energies below 0.5 eV changes very little with time, particularly if the solid-state device 11 is kept in the dark at the low temperature. These effects will also persist even when the structure is at room temperature for a considerable period of time, provided it is kept in the dark. In fact, the charge storage persists at a useful level if the detector is kept in the dark at room temperature for many hours.

The source 18 of write-in radiation used with the InSb-MOS structure 11 may be a tungsten lamp with a spectrum peaking in the neighborhood of 1 micron. The source of read-out radiation 25 may be a relatively low-intensity helium-neon laser. The read-out source 25 could also be an InAs diode producing 3.9 micron radiation.

Write-in and read-out can be accomplished using radiation of different intensities and/or different exposure times. For example, write-in could be accomplished with a relatively high intensity beam peaking at about 1 micron wavelength and read-out could be accomplished with the same or even greater energy radiation, but of much lower intensity. Such a system would eventually destroy the stored information. The approach which writes-in with relatively short wavelengths and reads-out with longer wavelengths does not destroy the information.

As already mentioned, when photon energy of the write-in radiation is greater than about 1.2 eV, charge becomes trapped in the dielectric layer 14 regardless of the initial state of the system. If the write-in radiation is below 1.2 eV and the oxide has not been previously charged by, for example, previous illumination, a positive bias applied to the InSb will prevent electrons from entering the oxide by the barrier at the interface. However, a negative bias would lower the barrier. Thus, the bias can be used to enhance or exclude the effect of write-in radiation on the structure. For example, a negative bias applied to the InSb during write-in will enhance the tendency for electrons to be driven across the interface and trapped in the dielectric 14 and so write-in could be accomplished using relatively low photon energy radiation (even lower than 1.2 eV). Similarly, during the read-out interval a positive bias applied to the InSb would prevent this phenomena and so the amount of charge trapped in the dielectric layer 14 would not be changed, even though relatively high (higher than 0.5 eV) photon energy radiation were employed for read-out. By use of different bias voltages and different light intensity applied to the InSb during the write-in and read-out intervals, it is quite possible to use the same wavelength radiation to accomplish both.

FIG. 3 illustrates use of the solid-state structure 11 with means for varying the bias voltage of the InSb layer 13, relative to the voltage applied to the conductive film 15. Here, a utilization device 26 and bias source 27 in series with resistance 27a are electrically connected across the structure 11. The write-in radiation 28 and the read-out radiation 29 are derived from sources 30 and 31 respectively, which are in turn controlled to emit their respective radiations by interval control circuit 32. The control circuit controls the intervals during which the sources 30 and 31 emit radiation and also controls the bias voltage applied from bias source 27 across resistance 27a and the structure 11. Thus, when the structure does not draw current, full bias is applied to the InSb 13. These controls are such that the structure 11 is illuminated by write-in radiation 28, while simultaneously a negative bias is applied from 27 across resistance 27a and the structure 11. Subsequently, during another interval, the source 31 emits the read-out radiation 29 which illuminates the structure while, simultaneously a positive bias is applied. As already mentioned, for some applications, the write-in and read-out radiation may be derived from a single source with the proper bias being applied during the write-in and read-out intervals, so that signals are read in and subsequently read out without undue destruction of the stored signal.

In addition to photon energy and bias, two other control parameters are available. These are radiation intensity and interval of exposure. Both of these may also be employed in combination with the selected radiation photon energies and bias voltages to further enhance operation and to operate with a single source of radiation for both write-in and read-out.

The information stored in the solid-state structure 11 can be erased in a number of different ways. Quite clearly, depending on the photon energy of the read-out radiation, the intensity of the read-out radiation, the interval of the read-out radiation, and the bias condition of the InSb, the amount of erasure which occurs each time the information is read out can be controlled. Erasure can also be accomplished by heating the structure to return the trapped charge to an initial state. However, the most rapid erasure is accomplished using a third wavelength of radiation for illuminating the structure. More particularly, the lifetime of the trapped charge can be shortened by using a wavelength characteristic of the structure which will force the dielectric to conduct and thereby remove the trapped charge. For example, with the InSb-MOS structure described herein, erasure is accomplished quickly with radiation from a mercury lamp. This use is illustrated in FIG. 4.

Figure 4:
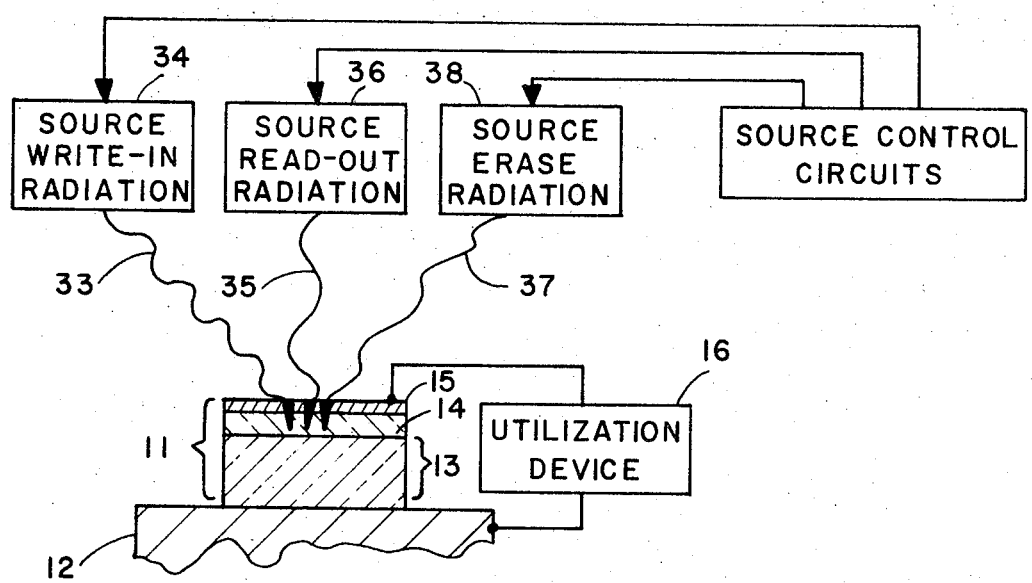
FIG. 4 is a cross-section view illustrating an embodiment using a MIS structure and including sources of write-in radiation, read-out radiation and erase radiation.

The solid-state structure 11 in FIG. 4 is the InSb-MOS structure employing n-type InSb as already described, and formed with layer thicknesses, as already described. The write-in source of radiation 33 is a tungsten lamp 34 with a spectrum peaking in the neighborhood of 1 micron. The source of read-out radiation 35 is a helium-neon laser 36 producing 3.4 micron radiation. The source of erase radiation 37 is a mercury lamp 38 producing very intense radiation mostly of wavelength less with 1 micron. The erase radiation from the mercury lamp causes the dielectric layer 14 to conduct and so any charge trapped therein is very quickly removed.

The sources 34, 36, and 38 are controlled by a control circuit 35 so that the intensity of radiation directed by each to the structure 11 and the intervals of irradiation can be varied.

A multitude of solid-state information storage structure such as 11 can be used in a relatively large, two-dimensional array, the surface of which is scanned by the write-in and read-out beams to store and read out information from any single one of the separate structures. The beams have random access to the two-dimensional array and so information read-in and read-out can be accomplished as rapidly as the radiation beams can be moved about to select individual structures in the array.

Figure 5:
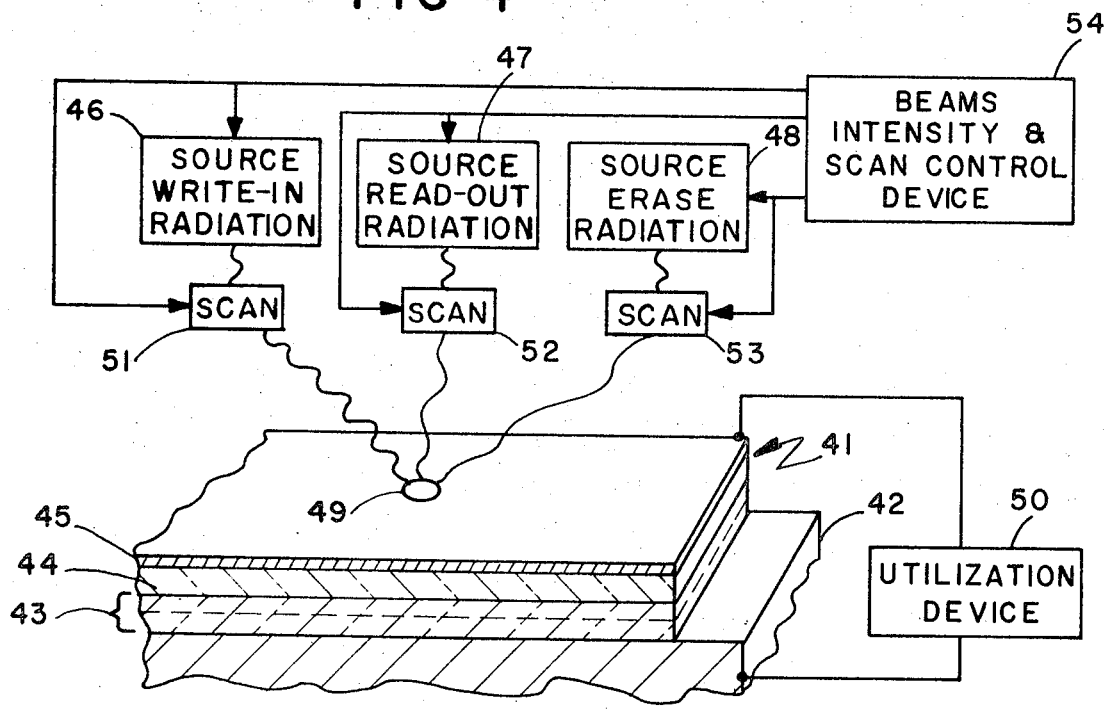
FIG. 5 is a cross-section isometric view illustrating use of a multitude of storage points in a two-dimensional array of the storage devices.

In place of an array of separate storage structures, each constructed and operated as shown in any of the FIGS. 1 to 4, a relatively large area sheet formed of substantially the same layers of materials can be substituted. FIG. 5 illustrates a section of such a the sheet 41 laid down on a conductive base 42. The layers which form the sheet consist of a semiconductor layer 43, a dielectric or insulating layer 44 on the film, and an electrically conductive film 45 on that. The conductive film 44 and insulator layer 43 are at least partly transparent to the incident radiation from write-in, read-out and erase sources 46, 47, and 48. Each of these sources provides appropriate radiation and is equipped with a mechanism whereby the radiation can be turned on and off and caused to scan the surface of the sheet.

At each point, such as 49, throughout the area of the sheet, the layers form the equivalent of a single storage structure, such as the structure 11 already described, and so the sheet represents a two-dimensional array of the structures. When information stored on a particular point on a sheet is read out by illuminating with radiation from the read-out source 47, an output signal will be produced which will be conducted by the film 45 to the utilization device 50 and will represent only the information stored at the particular point on the sheet interrogated controls the read-out beam.

In operation, the beam scan controls 51 and 52 for the write-in and read-out beams direct either of these beams to any selected spot on the sheet. These scan controls and the sources 46 to 48 are controlled by device 54. When directed to a selected spot, the write-in beam is energized to store information at that spot. Thereafter, the read-out beam is directed to the same spot and energized, while simultaneously the signal is coupled to the conductive film 45 and conducted to the utilization device 50 and detected. Thus, the information stored at the particular spot is read out without destruction. The information at that spot can be erased by directing the erase beam to the same spot and energizing it or the entire sheet can be flooded by radiation for erasing, thereby erasing all information stored.

Figure 6:
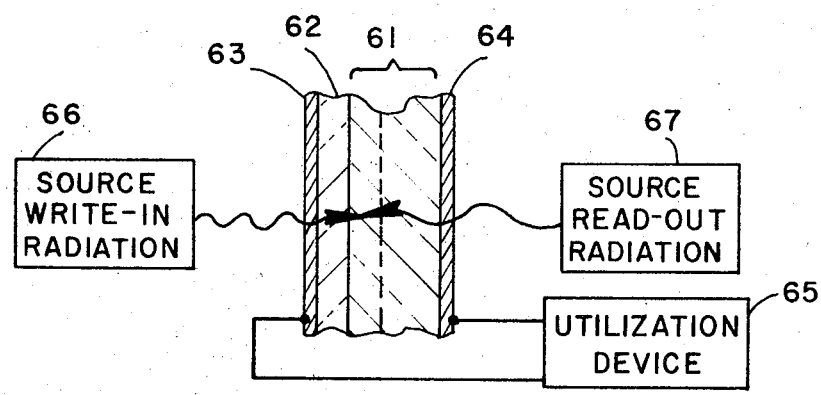
FIG. 6 is a cross-section view illustrating an embodiment in which the write-in and read-out radiations are directed to the device through opposite sides.
Figure 7:
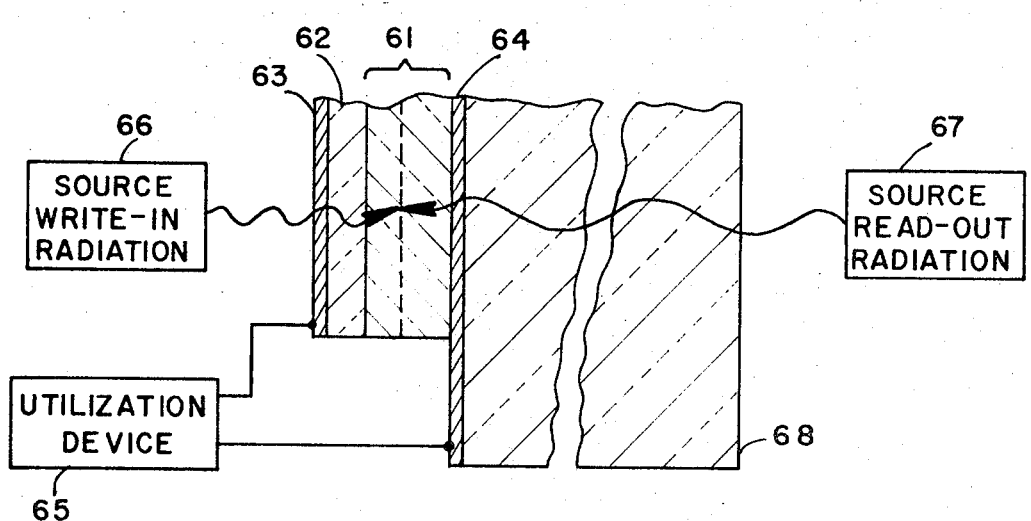
FIG. 7 is a cross-section isometric view of a two-dimensional array of the structure shown in FIG. 6.

For some applications, using the two-dimensional storage sheet shown in FIG. 5, it is preferred to direct the write-in radiation to the sheet from one side and to direct the read-out radiation from the opposite side, and so in this case, both sides of the sheet may be formed as illustrated in FIG. 6, including semiconductor and oxide layers 61 and 62 sandwiched between electrically conductive films 63 and 64. The utilization device 65 is connected across the films 63 and 64 and the source 66 of write-in radiation is located on one side of the sheet while the source 67 of read-out radiation is located on the opposite side. Since the sheet is very thin, it is practical to form it including the conductive layers 63 and 64 on a heavier substrate 68, which is transparent to radiation directed thereto. This is shown in FIG. 7. These structures shown in FIGS. 6 and 7 are particularly useful for storing signals representing an optical image in a system such as shown in FIG. 8.

Figure 8:
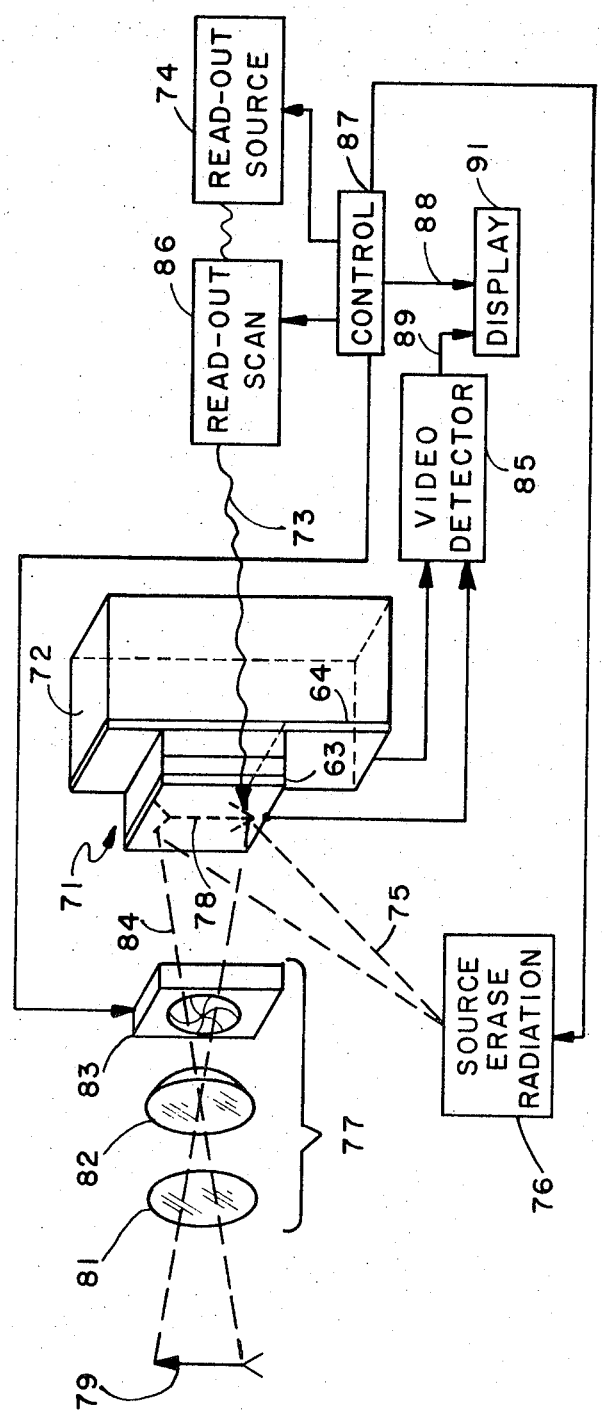
FIG. 8 is a schematic block diagram of a system employing the structure shown in FIG. 7 for generating TV-like signals representing an object or scene.

The system in FIG. 8 includes the solid-state information storage array or sheet, supported as shown in FIGS. 6 and 7, and denoted 71. The sheet is supported on a much heavier base 72 which is transparent to the read-out radiation from the source 74 on one side of the structure. On the other side of the structure, an optical system 77 focuses an image 78 of an object 79 on sheet 71. The optical system 77 includes suitable filters and lenses 81 and 82 and a shutter 83, so that the radiation 84 which defines the image is of suitable wavelength and exposes the sheet 71 for a suitable interval to store charge at points on the sheet which define the image 78. Thereafter, this stored image is read by scanning the opposite side of the sheet through the heavier substrate 72 by the read-out radiation 73 from the source 74 and simultaneously detecting the electrical signal across the conductive films 63 and 64, which electrically connect to video detector circuit 85.

The read-out beam 73 is caused to scan by a scan mechanism 85, which may be mechanical and consist of moving or vibrating mirrors and which is controlled in conjunction with energization of the source 74, by a control system 87. The output 88 of the control system 87 represents the read-out scan pattern and the output 89 of the detector 85 represents video. These outputs are combined in a display 91 to present the stored image in typical TV fashion. The control 87 also controls energization of the erase beam source 76 and the shutter 83, by which a stored image is erased and a new image is stored on the structure 71.

The erase radiation 75 must impinge on the dielectric layer 62, particularly when fast erase by radiation flooding is desired, and the erase radiation photon energy is high (such as from a mercury lamp) because the semiconductor is not transparent to such radiation. For this reason, the erase radiation 75 is directed to the dielectric layer 62 through the conductive layer 63. Thus, the source 76 of erase radiation is on the same side of structure 71 as the incident image radiation 84.

The signal storage structure 11 described herein and formed as a single chip for storing information, as illustrated in FIGS. 2 to 4 and the sheet providing a matrix of storage points, as illustrated in FIGS. 5 to 8 may all be constructed by oxidizing the surface of a chip or sheet of n-type InSb to provide an insulating or dielectric layer thereon of precisely controlled thickness and then forming a thinner layer of electrically conductive material, such as a film of nickel, on that. However, quite clearly, the techniques illustrated and described with respect to the FIGS. 1 to 8 can be employed in the operation of structures which are not specifically MIS or MOS structures. In addition, other materials could be employed to form a suitable MIS or MOS solid-state structure in chip form or in the form of a sheet for storing bits of information or arrays of bits of information or for storing optical images.

Other combinations of semiconductor materials, dielectric layers, and suitable energies of write-in, read-out and erase beams can be used. For example, the semiconductor may be Silicon, Germanium, GaAs or Lead-Tin-Telluride and the dielectric may be Silicon Dioxide, Silicon Nitride, Magnesium Fluoride, Selenium, or of course the oxide of the semiconductor material. The write-in radiation photon energy is preferably greater and the read-out radiation photon energy is preferably less than the band gap of the semiconductor. The erase radiation photon energy is also greater than the band gap of the semiconductor and in the ultraviolet for fast erase. In general, the band gap of the dielectric material should be greater than the band gap of the semiconductor material.

The various embodiments described herein are examples of some best known uses of the invention, employing in particular an n-type InSb-MOS structure. However, it is to be clearly understood that this structure is described in particular as an example of a useful embodiment of the invention and is not intended to limit the spirit and scope of the invention, as set forth in the accompanying claims.

What is claimed is:

1. A device for storing signals in response to radiation comprising,
    a solid state sandwich of contiguous layers including a layer of n-type semiconductor, a layer of dielectric and a layer of conductor, in that order, and subjected to an environment such that a substantial charge accumulation region exists in the semiconductor layer adjacent the dielectric layer,
    means for directing write-in radiation to the semiconductor of substantially greater photon energy than the semiconductor band gap and of sufficient intensity to release and energize charge in the semiconductor so that the charge transfers to the dielectric changing the charge accumulation region to a charge depletion region,
    an electrical conductor in contact with said semiconductor,
    utilization means in electrical circuit with the sandwich conductor and the contacting electrical conductor, and
    means for directing read-out radiation to the semiconductor of photon energy sufficient to release charge in said depletion region, producing an electrical signal in the utilization means which is representative of the charge depletion region in the semiconductor layer.
2. A device as in claim 1 wherein,
    the write-in radiation and the read-out radiation are directed to the semiconductor during different intervals.
3. A device as in claim 1 wherein,
    the intensity of the read-out radiation is relatively low so that the charge depletion region is not substantially altered.
4. A device as in claim 1 wherein,
    the intensity of the read-out radiation is substantially lower than the intensity of the write-in radiation.
5. A device as in claim 1 wherein,
    a negative voltage relative to the conductor layer is applied to the semiconductor while directing write-in radiation thereto.
6. A device as in claim 1 wherein,
    a positive voltage relative to the conductor layer is applied to the semiconductor while directing read-out radiation thereto.
7. A device as in claim 1 wherein,
    the dielectric material is the oxide of the semiconductor material.
8. A device as in claim 7 wherein,
    the semiconductor is InSb and the dielectric layer is formed thereon by anodizing a surface thereof.
9. A device as in claim 1 wherein,
    erase radiation is directed to the semiconductor while a suitable bias voltage is applied to the sandwich to erase the stored binary information.
10. A device as in claim 9 wherein,
    the photon energy of the erase radiation is substantially higher than the write-in radiation.
11. A device as in claim 9 wherein,
    a negative voltage relative to the conductive layer is applied to the conductive layer is applied to the semiconductor while directing erase radiation thereto.
12. A system for converting an optical image into electrical signals representative of the image comprising an array of devices as in claim 1 defining an image plane, the write-in radiation is an optical image focused on the image plane, all the devices in the array are connected in parallel with the utilization means, the read-out radiation is a scanning beam and means are provided for causing the scanning beam to scan the array in a pattern, whereby electrical signals are produced in the utilization means which combined with the scan pattern define the image.

13. A system as in claim 12 wherein,
the array of devices in a continuous sheet which provides at each point thereon a device as in claim 1.

14. A system as in claim 12 wherein
the dielectric layer is the oxide of the semiconductor.

15. A system as in claim 12 wherein
the semiconductor is InSb and the dielectric layer is formed thereon by anodizing a surface thereof.

16. A system as in claim 12 wherein,
the image radiation optical path is on one side of the array and the scanning beam path is on the opposite side of the array.

17. A system as in claim 16 wherein,
the image radiation path is on the conductor layer side of the array.

18. A device for storing signals in response to radiation comprising, a solid state sandwich of contiguous layers including a layer of p-type semiconductor, a layer of dielectric and a layer of conductor, in that order, and subjected to an environment such that a substantial charge depletion region exists in the semiconductor layer adjacent the dielectric layer, means for directing write-in radiation to the semiconductor of substantially greater photon energy than the semiconductor band gap and of sufficient intensity to release and energize charge in the semiconductor so that the charge transfers to the dielectric changing the charge electrical region to a charge accumulation region, an electric conductor in contact with said semiconductor, utilization means in electrical circuit with the sandwich conductor and the contacting electrical conductor, and means for directing read-out radiation to the semiconductor of photon energy sufficient to release charge in said accumulation region, producing an electrical signal in the utilization means which is representative of the charge accumulation region in the semiconductor layer.

19. A device as in claim 18 wherein,
the write-in radiation and the read-out radiation are directed to the semiconductor during different intervals.

20. A device as in claim 18 wherein,
the intensity of the read-out radiation is relatively low so that the charge accumulation region is not substantially altered.

21. A device as in claim 18 wherein,
the intensity of the read-out radiation is substantially lower than the intensity of the write-in radiation.

22. A device as in claim 18 wherein
erase radiation is directed to the semiconductor while a suitable bias voltage is applied to the sandwich to erase the stored binary information.

23. A device responsive to incident radiation comprising, a solid state sandwich of contiguous layers including a layer of semiconductor, a layer of dielectric and a layer of conductor in that order, means for directing write-in radiation to the sandwich, whereby the amount of charge stored in the dielectric layer is changed, an electrical conductor in contact with said semiconductor, utilization means in electrical circuit with the sandwich conductor and the contacting electrical conductor, and means for directing read-out radiation to the sandwich, the write-in and read-out radiation being of substantially different wavelengths whereby the write-in radiation represents an input signal and the read-out radiation causes an electrical signal to be produced in the utilization means which is representative of said input signal.

24. A device responsive to incident radiation comprising, a solid state sandwich of contiguous layers including a layer of semiconductor, a layer of the oxide of the semiconductor and a layer of conductor, in that order, means for directing write-in radiation to the sandwich, whereby the amount of charge stored in the oxide layer is changed, an electrical conductor in contact with said semiconductor, utilization means in electrical circuit with the sandwich conductor and the contacting electrical conductor, and means for directing read-out radiation to the sandwich, whereby the write-in radiation represents an input signal and the read-out radiation causes an electrical signal to be produced in the utilization means which is representative of said input signal.

25. A device responsive to incident radiation comprising, a solid state sandwich of contiguous layers including a layer of n-type InSb, a layer of dielectric formed by anodizing a surface of the InSb and a layer of conductor in that order, means for directing write-in radiation to the sandwich, whereby the amount of charge stored in the dielectric layer is changed utilization means in electrical circuit with the sandwich and means for directing readout radiation to the sandwich, whereby the write-in radiation represents an input signal and the read-out radiation causes an electrical signal to be produced in the utilization means which is representative of said input signal.

* * * * *

UNITED STATES PATENT OFFICE
CERTIFICATE OF CORRECTION

Patent No. 3,746,867    Dated July 17, 1973

Inventor(s) PHELAN, ROBERT J., ET. AL.

It is certified that error appears in the above-identified patent and that said Letters Patent are hereby corrected as shown below:

On the cover sheet [75], "Robert J. Phela, Jr." should read -- Robert J. Phelan, Jr. -- .

Signed and sealed this 25th day of December 1973

(SEAL)
Attest:

EDWARD M. FLETCHER, JR.
Attesting Officer

RENE D. TEGTMEYER
Acting Commissioner of Patents